(12) United States Patent
Kim et al.

(10) Patent No.: US 11,004,087 B1
(45) Date of Patent: May 11, 2021

(54) SYSTEMS AND METHODS FOR PROCESSING EXCEPTION EVENT REQUEST TO IDENTIFY DEFECTIVE PRODUCT

(71) Applicant: COUPANG CORP., Seoul (KR)

(72) Inventors: Binna Kim, Seoul (KR); Jae Hee Lee, Seoul (KR); Myeong Woo Yang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/895,682

(22) Filed: Jun. 8, 2020

(51) Int. Cl.
*G06Q 30/00* (2012.01)
*G06Q 30/06* (2012.01)
*G06F 16/23* (2019.01)
*G06Q 30/02* (2012.01)
*G06Q 10/08* (2012.01)

(52) U.S. Cl.
CPC ..... *G06Q 30/0185* (2013.01); *G06F 16/2379* (2019.01); *G06Q 10/087* (2013.01); *G06Q 30/014* (2013.01); *G06Q 30/0201* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 8,744,886 B1 * | 6/2014 | Mishra | G06Q 10/06395 705/7.12 |
| 8,781,882 B1 * | 7/2014 | Arboletti | G06Q 10/0639 705/7.39 |
| 2005/0004811 A1 * | 1/2005 | Babu | G06Q 30/014 705/7.41 |
| 2005/0027487 A1 * | 2/2005 | Iyer | G06Q 30/02 702/185 |
| 2012/0278205 A1 * | 11/2012 | Chin | G06Q 10/087 705/28 |
| 2014/0344139 A1 * | 11/2014 | Smith | H04L 67/12 705/39 |
| 2015/0253767 A1 * | 9/2015 | Heinecke | G05B 19/41865 700/105 |
| 2017/0103043 A1 * | 4/2017 | Matsuno | G05B 19/41875 |
| 2019/0215424 A1 * | 7/2019 | Adato | G06Q 30/0629 |

OTHER PUBLICATIONS

Notice of Preliminary Rejection from the Korean Intellectual Property Office (KIPO) for counterpart Application No. 10-2020-0083592, dated Jan. 4, 2021 (6 pages).

* cited by examiner

*Primary Examiner* — Thomas L Mansfield
(74) *Attorney, Agent, or Firm* — Finnegan, Henderson, Farabow, Garrett and Dunner, LLP

(57) ABSTRACT

A system for processing exception event request to identify defective product includes one or more processors configured to receive, from a customer device, an exception event request associated with a product included in an order, the received exception event request comprising a product identifier. Access database to identify a number of exception event requests associated with the product identifier stored in the database. Determine when the number of exception event requests associated with the product identifier exceeds a predetermined threshold number of exception event requests for the product identifier. In response to determining that the number of exception event requests associated with the product identifier exceeds the predetermined threshold number of exception event requests, identify the product as a defective product.

20 Claims, 12 Drawing Sheets

SYSTEMS AND METHODS FOR PROCESSING EXCEPTION EVENT REQUEST TO IDENTIFY DEFECTIVE PRODUCT

TECHNICAL FIELD

The present disclosure generally relates to computerized systems and methods for identifying a defective product. In particular, embodiments of the present disclosure relate to inventive and unconventional systems for processing an exception event request to identify a defective product.

BACKGROUND

Users (e.g., online customers) often use websites (e.g., e-commerce websites) or mobile applications to order products (e.g., purchase food, groceries, etc.). When products available on the e-commerce websites are not satisfactory to the needs or requirements of the customer (e.g., defects in electronic devices, rotten or expired fresh food products, broken products, dented products), the customer may wish to exchange the product or return the product and get a refund for the product. By way of example, such situations would result in a generation of refund or exchange events. A refund or exchange event is an event where the customer would either request a refund or may request an exchange of the product from the e-commerce website. Products that are being exchanged or returned may be sold by certain vendors that have manufactured the product with defects within it. Such products with manufacturing defects may result in a high number (e.g., thousands if not millions) of refund or exchange requests from customers for those products. Receiving and processing of such a high number of refund or exchange requests because of manufacturing defects may result in higher overhead costs for the e-commerce websites. Further, processing of such a high volume of refund or exchange requests from customers may cause bottlenecks in network utilization, as servers may be overloaded by the unexpected volume of requests received. This may result in network delays, and thus may cause inefficient utilization of network resources. Even further, this may result in a dissatisfied customer as explained below.

Current solutions do not identify defects in products offered on e-commerce websites. Not being able to detect defects in products, results in customers exchanging or returning the defective products. This leads to customers not being able to receive their products on time or not being able to receive their products at all. Thus, customer orders may not be fulfilled, which may lead to dissatisfied customers. This, in turn, may cause a negative customer service experience and could potentially lead to customers stopping use of the e-commerce websites, resulting in loss of revenue.

Another issue, not addressed by current solutions, is that of correcting the defects identified in defective products. Current solutions in the marketplace do not remove a product identified as defective from e-commerce websites, which results in additional customers purchasing defective products and further providing exchange or return requests for those defective products. Accordingly, current solutions are inefficient and result in inefficient utilization of network resources and cause a negative customer experience. Thus, there is a need to identify products that are defective and correct the defects in those products.

SUMMARY

One aspect of the present disclosure is directed to a system for processing exception event request to identify defective product, the system comprising: a memory storing instructions; and at least one processor configured to execute the instructions to: receive, from a first customer device, an exception event request associated with a product included in an order associated with the first customer device, the received exception event request comprising a product identifier. Update a database by storing the received exception event requests with the product identifier. Access the database to identify a number of exception event requests associated with the product identifier stored in the database. Determine when the number of exception event requests associated with the product identifier exceeds a predetermined threshold number of exception event requests for the product identifier. In response to determining that the number of exception event requests associated with the product identifier exceeds the predetermined threshold number of exception event requests, and identify the product as a defective product. Generate an electronic task upon identifying the product as the defective product, and the electronic task comprising the product identifier. Transmit the electronic task to a user device. Updating a quantity of the product in a live inventory database in response to transmitting the electronic task to the user device, wherein the live inventory database comprise the one or more products that are available for purchase to the plurality of customers.

Another aspect of the present disclosure is directed to a computer implemented method for processing exception event request to identify defective product, the method comprising: receiving, from a first customer device, an exception event request associated with a product included in an order associated with the first customer device, and the received exception event request comprising a product identifier. Updating a database by storing the received exception event requests with the product identifier. Accessing the database to identify a number of exception event requests associated with the product identifier stored in the database. Determining when the number of exception event requests associated with the product identifier exceeds a predetermined threshold number of exception event requests for the product identifier. In response to determining that the number of exception event requests associated with the product identifier exceeds the predetermined threshold number of exception event requests, identify the product as a defective product. Generating an electronic task upon identifying the product as the defective product, the electronic task comprising the product identifier. Transmitting the electronic task to a user device. Updating a quantity of the product in a live inventory database in response to transmitting the electronic task to the user device, wherein the live inventory database comprise the one or more products that are available for purchase to the plurality of customers.

Yet another aspect of the present disclosure is directed to a computer implemented system for processing exception event request to identify defective product, the system comprising: a memory storing instructions; and at least one processor configured to execute the instructions to: receive, from a first customer device, an exception event request associated with a product included in an order associated with the first customer device, the received exception event request comprising a product identifier. Update a database by storing the received exception event requests with the product identifier. Access the database to identify a number of exception event requests associated with the product identifier stored in the database. Determine when the number of exception event requests associated with the product identifier exceeds a predetermined threshold number of exception event requests for the product identifier. In response to determining that the number of exception event requests associated with the product identifier exceeds the predetermined threshold number of exception event requests, identify the product as a defective product. Generate an electronic task upon identifying the product as the defective product, the electronic task comprising the product identifier. Transmit the electronic task to a user device. Updating a quantity of the product in a live inventory database in response to transmitting the electronic task to the user device, wherein the live inventory database comprise the one or more products that are available for purchase to the plurality of customers.

DETAILED DESCRIPTION

Figure 1A:
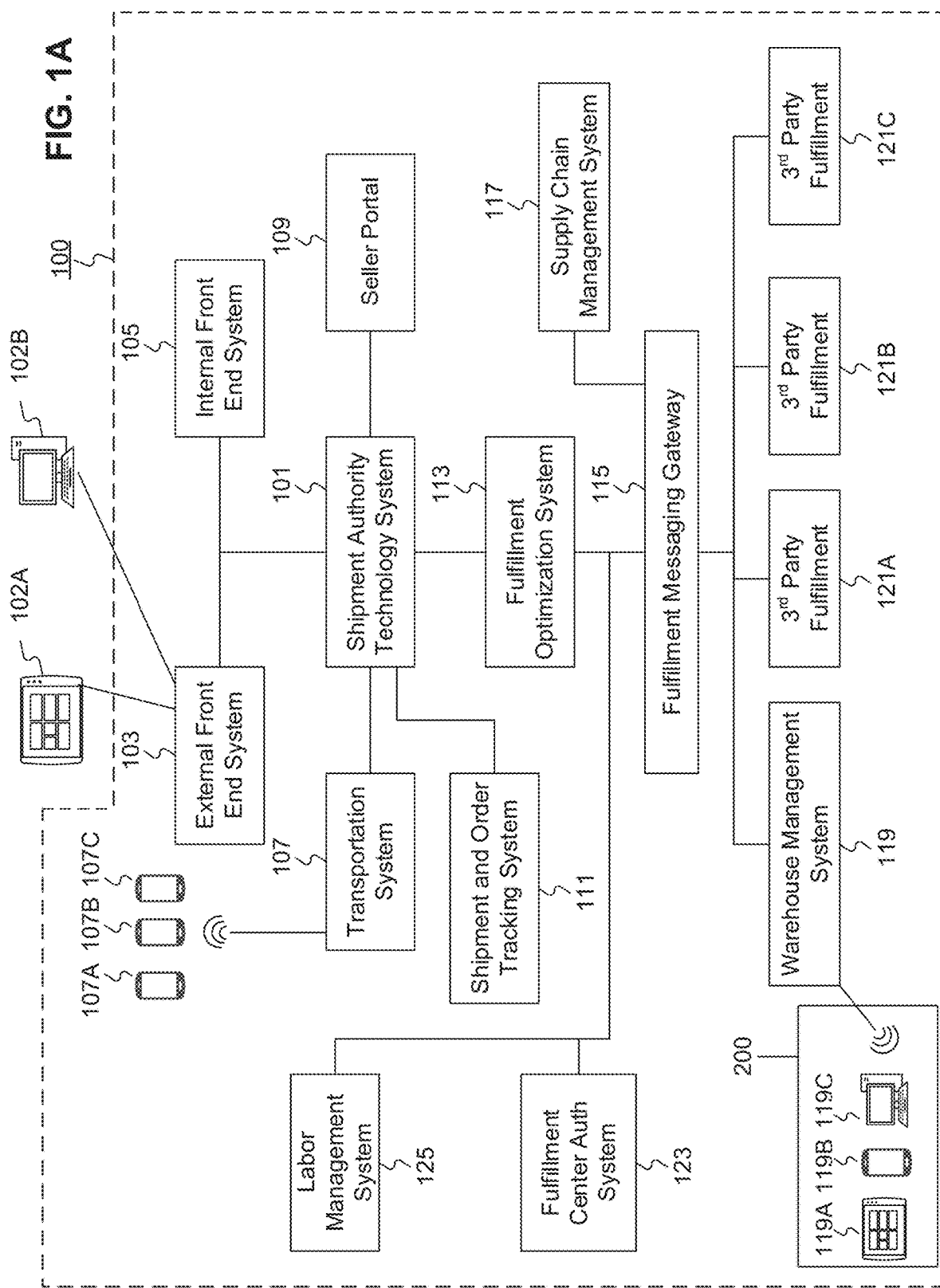
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for processing exception event request to identify defective product.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the products in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an product, external front end system 103 may be implemented as a web server that receives search requests, presents product pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of products in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, an "Add to Cart" button, a quantity field, a picture of the product, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes products in a virtual shopping cart along with interactive user interface elements, consistent with the disclosed embodiments.
Figure 1E:
FIG. 1E depicts a sample Order page that includes products from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per product, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the products from the shopping cart and requests input of payment and shipping information. For example, the Order page may include a section requesting information about the purchaser of the products in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to the external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an product, internal front end system 105 may be implemented as a web server that enables internal users to view diagnostic and statistical information about orders, modify product information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery; including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of a mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular products are held or stored. For example, certain products may be stored only in one fulfillment center, while certain other products may be stored in multiple fulfillment centers. In still other embodiments, certain fulfilment centers may be designed to store only a particular set of products (e.g., fresh produce or frozen products). FO system 113 stores this information as well as associated information (e.g., quantity, size, date of receipt, expiration date, etc.).

FO system 113 may also calculate a corresponding PDD) (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forwards it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking products from a pick zone, rebin wall work, packing products), a user identifier, a location (e.g., a floor or zone in a fulfillment center 200), a number of units moved through the system by the employee (e.g., number of products picked, number of products packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
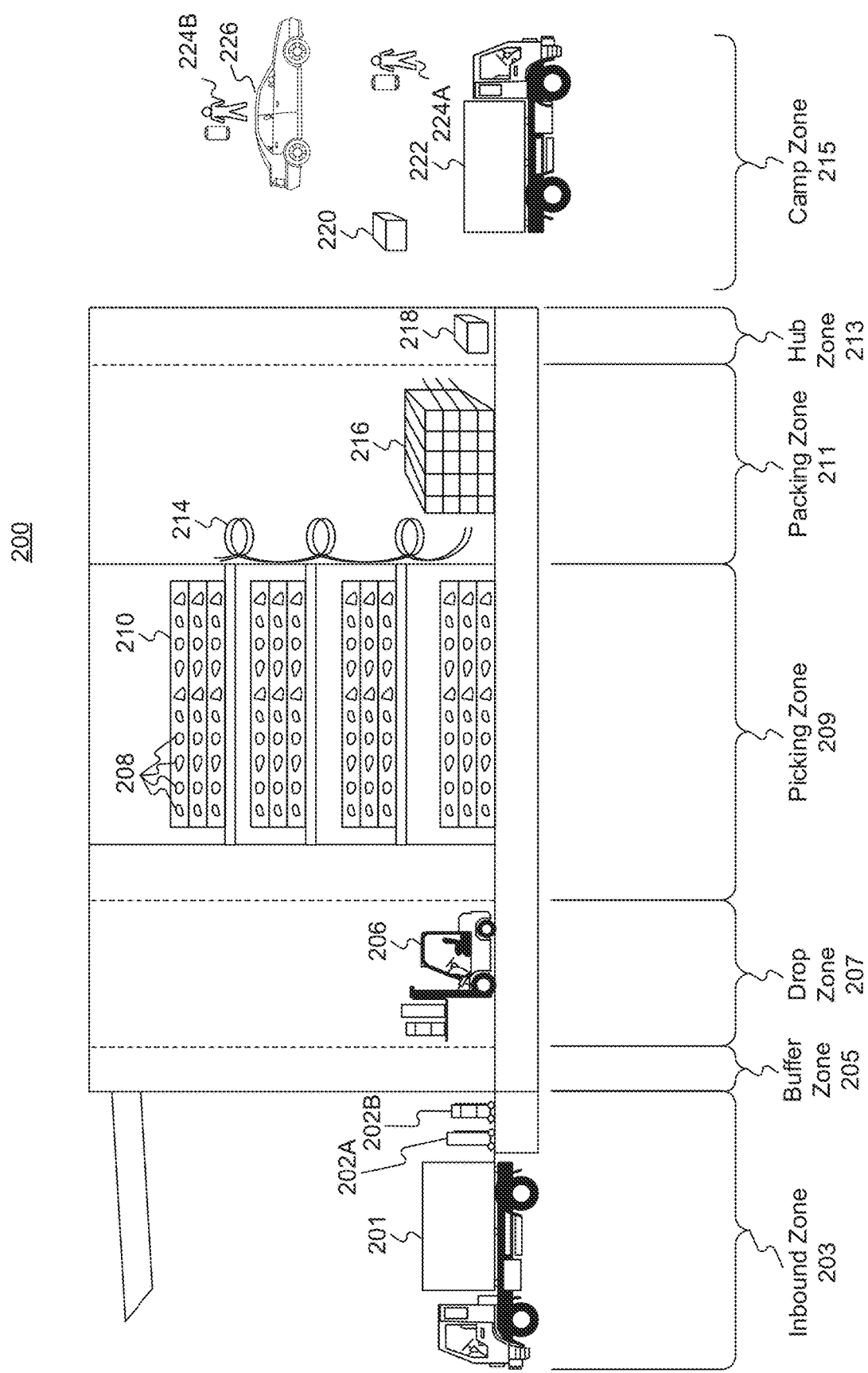
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores products for shipping to customers when ordered. Fulfillment center (FC) 200 may be divided into multiple zones, each of which are depicted in FIG. 2. These "zones," in some embodiments, may be thought of as virtual divisions between different stages of a process of receiving products, storing the products, retrieving the products, and shipping the products. So while the "zones" are depicted in FIG. 2, other divisions of zones are possible, and the zones in FIG. 2 may be omitted, duplicated, or modified in some embodiments.

Inbound zone 203 represents an area of FC 200 where products are received from sellers who wish to sell products using system 100 from FIG. 1A. For example, a seller may deliver products 202A and 202B using truck 201. Product 202A may represent a single product large enough to occupy its own shipping pallet, while product 202B may represent a set of products that are stacked together on the same pallet to save space.

A worker will receive the products in inbound zone 203 and may optionally check the products for damage and correctness using a computer system (not pictured). For example, the worker may use a computer system to compare the quantity of products 202A and 202B to an ordered quantity of products. If the quantity does not match, that worker may refuse one or more of products 202A or 202B. If the quantity does match, the worker may move those products (using, e.g., a dolly, a handtruck, a forklift, or manually) to buffer zone 205. Buffer zone 205 may be a temporary storage area for products that are not currently needed in the picking zone, for example, because there is a high enough quantity of that product in the picking zone to satisfy forecasted demand. In some embodiments, forklifts 206 operate to move products around buffer zone 205 and between inbound zone 203 and drop zone 207. If there is a need for products 202A or 202B in the picking zone (e.g., because of forecasted demand), a forklift may move products 202A or 202B to drop zone 207.

Drop zone 207 may be an area of FC 200 that stores products before they are moved to picking zone 209. A worker assigned to the picking task (a "picker") may approach products 202A and 202B in the picking zone, scan a barcode for the picking zone, and scan barcodes associated with products 202A and 202B using a mobile device (e.g., device 119B). The picker may then take the product to picking zone 209 (e.g., by placing it on a cart or carrying it).

Picking zone 209 may be an area of FC 200 where products 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move products into picking zone 209 in multiple ways, including, for example, a forklift, an elevator, a conveyor belt, a cart, a handtruck, a dolly, an automated robot or device, or manually. For example, a picker may place products 202A and 202B on a handtruck or cart in drop zone 207 and walk products 202A and 202B to picking zone 209.

A picker may receive an instruction to place (or "stow") the products in particular spots in picking zone 209, such as a particular space on a storage unit 210. For example, a picker may scan product 202A using a mobile device (e.g., device 119B). The device may indicate where the picker should stow product 202A, for example, using a system that indicate an aisle, shelf, and location. The device may then prompt the picker to scan a barcode at that location before stowing product 202A in that location. The device may send (e.g., via a wireless network) data to a computer system such as WMS 119 in FIG. 1A indicating that product 202A has been stowed at the location by the user using device 119B.

Once a user places an order, a picker may receive an instruction on device 119B to retrieve one or more products 208 from storage unit 210. The picker may retrieve product 208, scan a barcode on product 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Product 208 may then arrive at packing zone 211.

Packing zone 211 may be an area of FC 200 where products are received from picking zone 209 and packed into boxes or bags for eventual shipping to customers. In packing zone 211, a worker assigned to receiving products (a "rebin worker") will receive product 208 from picking zone 209 and determine what order it corresponds to. For example, the rebin worker may use a device, such as computer 119C, to scan a barcode on product 208. Computer 119C may indicate visually which order product 208 is associated with. This may include, for example, a space or "cell" on a wall 216 that corresponds to an order. Once the order is complete (e.g., because the cell contains all products for the order), the rebin worker may indicate to a packing worker (or "packer") that the order is complete. The packer may retrieve the products from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the products in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Reference will now be made to in detail to the disclosed embodiments illustrated in the accompanying of FIGS. 3, 4, 5, & 6A-6C. Wherever convenient, the same reference numbers will be used throughout the drawings to refer to the same or like parts.

While the following description is directed to fraud detection in e-commerce transactions, these embodiments are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs.

Figure 3:
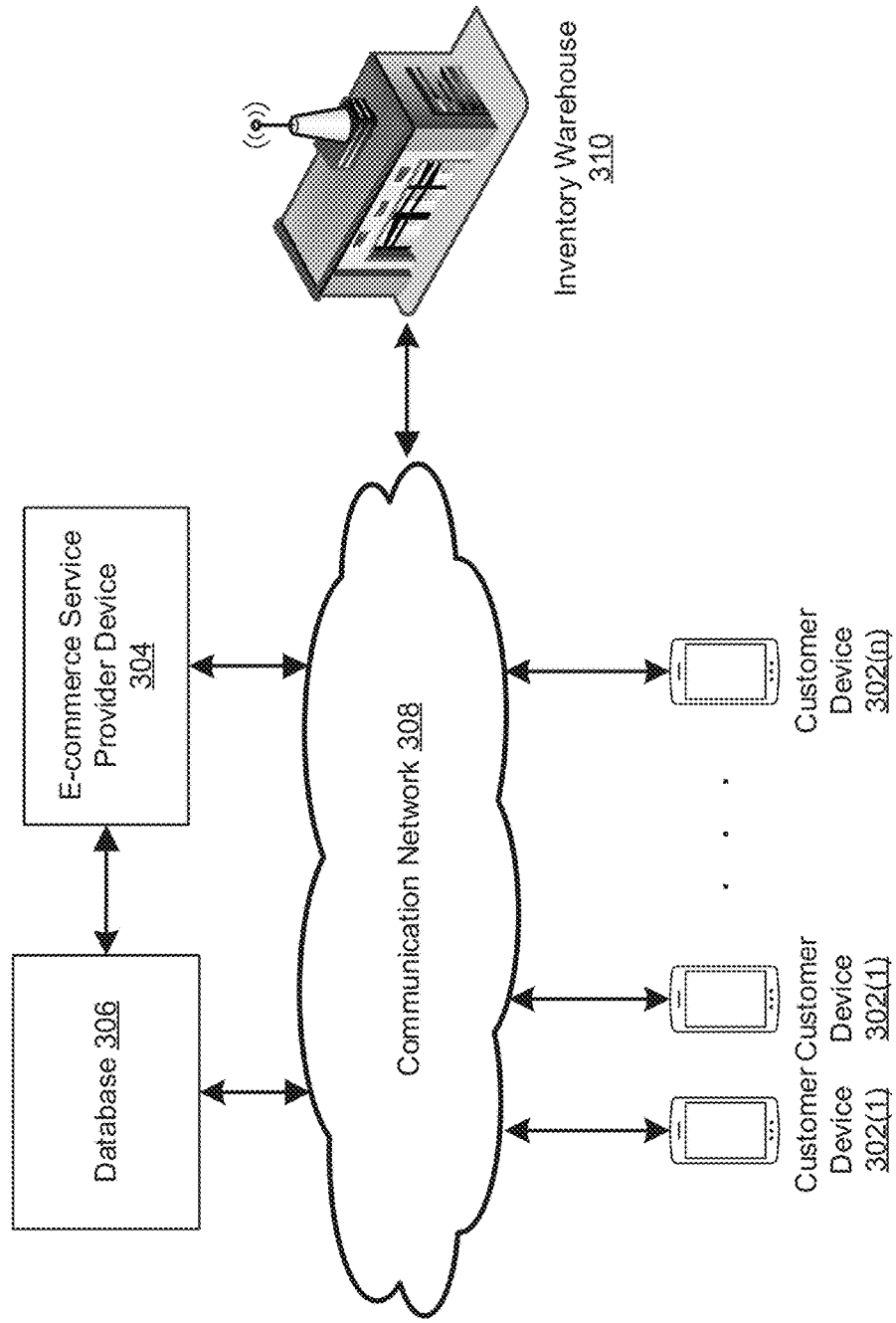
FIG. 3 is a block diagram of an exemplary system, consistent with disclosed embodiments.

FIG. 3 is a block diagram of an exemplary system 300, for performing one or more operations consistent with disclosed embodiments. In some embodiments, system 300 may include one or more customer devices 302(1), . . . 302(n), one or more e-commerce service provider devices 304, one or more databases 306, one or more inventory warehouses 310, and communication network 308. The system 300 may also include a plurality of e-commerce service provider devices 304, a plurality of databases 306, and a plurality of inventory warehouses 310 communicating with each other directly and further communicating with the customer devices 302(1)-302(n), via the communication network 308. The components and arrangement of the components included in system 300 may vary. Thus, system 300 may include other components that may perform or may assist in the performance of one or more operations consistent with the disclosed embodiments. In an exemplary embodiment, components of system 300 may be implemented as any of the components of block diagram 100 to perform operations of FIGS. 1A-1E. In another exemplary embodiment, components of system 300 may be implemented as part of block diagram 100 to perform operations of FIGS. 1A-1E.

As more fully described below, customer devices 302(1)-302(n), e-commerce service provider device 304, database 306, and inventory warehouse 310 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of customer device(s) 302(1)-302(n), e-commerce service provider device 304, database 306, and inventory warehouse 310 may be configured to communicate with one or more other components of system 300 via communication network 308, for example. In certain aspects, users (e.g., customers) operate customer devices 302(1)-302(n), may interact with one or more components of system 300 by sending and receiving communications, initiating operations, and/or providing input for one or more operations consistent with the disclosed embodiments.

E-commerce service provider device 304 may be associated with an e-commerce website that receives, processes, manages, or otherwise offers ordering or buying services or products to customers. For example, the products that may be ordered via the e-commerce website may include, prepared food, groceries, furniture, books, computers, and/or clothes, although any other type of products may also be ordered. For example, the e-commerce service provider device 304 may receive order requests from customers using customer devices 302(1)-302(n) and process the received order requests to ship products ordered in the order request to the customers associated with the order request. Upon receiving order requests from the one or more customer devices 302(1)-302(n), e-commerce service provider device 304, may transmit an order accepted request to the one or more customer devices 302(1)-302(n) that placed the order. E-commerce service provider device 304 may transmit the ordered request for processing, as explained in detail below.

Database 306 of system 300 may be communicatively coupled to e-commerce service provider device 304 directly or via communication network 308. Further, database 306 of system 300 may be communicatively coupled to one or more of customer devices 302(1)-302(n), inventory warehouse 310, and/or e-commerce service provider device 304 via the communication network 308. Database 306 may include one or more memory devices that may store information and may be accessed and/or managed by one or more components of system 300. By way of example, database 306 may include Oracle™ databases, Sybase™ databases, or other relational databases or nonrelational databases, such as Hadoop sequence files, HBase, or Cassandra. Database 306 may include computing components (e.g., database management system, database server, etc.) configured to receive and process requests for data stored in memory devices of database 106 and to provide data from database 306.

Database 306 may be configured to store, among another things, customer profile information for customers associated with the customer devices 302(1)-302(n), and a list of products available in an inventory. List of products available in the inventory may include products that may be ordered via e-commerce websites, which may include, prepared food, groceries, furniture, books, computers, and/or clothes, although any other type of products may also be included in the inventory. Further, customer profile information in database 306 may include customer name, customers home address, pictures of customer, customer order history and/or customer phone number, although any other type of information associated with the merchant can also be included. A customer order history may include, order information associated with orders placed by customers to purchase products via e-commerce websites. Order information may include products purchased, time of purchase, cost of products, shipping information, etc., although any other type of information associated with an order for an e-commerce website may also be included.

In one aspect, e-commerce service provider device 304 may include one or more computing devices, configured to perform one or more operations consistent with disclosed embodiments as described more fully below in relation to FIGS. 6A-6C. In one aspect, e-commerce service provider device 304 may include one or more servers or server systems. E-commerce service provider device 304 may include one or more processors configured to execute software instructions stored in a memory or other storage device. The one or more processors may be configured to execute the stored software instructions to perform internet-related communication, order-based processes of receiving and processing order requests and providing exchanges and/or refunds. The one or more computing devices of e-commerce service provider device 304 may be configured to store customer profile information and a list of products available in an inventory (e.g., in inventory warehouse 310). The one or more computing devices of e-commerce service provider device 304 may also be configured to communicate with other components of system 300 to receive and process order requests. In some embodiments, e-commerce service provider device 304 may provide one or more mobile applications, web-sites or online portals that are accessible by customer devices 302(1)-302(n) over communication network 308. The disclosed embodiments are not limited to any particular configuration of e-commerce service provider device 304.

Inventory warehouse 310 may be a storage facility location where products sold by e-commerce websites are stored. By way of example, products may include fresh food, prepared food, grocery, electronics, medicines, or furniture, although any other type of products available to shop on an e-commerce website may also be included. Database 306 may store data associated with all the available products and the quantity of each of the products present inventory warehouse 310. Data associated with all the available products and the quantity of each of the products stored at database 306 may be updated periodically by service personnel present at the inventory warehouse 310. In some embodiments, inventory warehouse 310 may be implemented as described above with respect to fulfillment center (FC) 200.

Communication network 308 may comprise any type of computer networking arrangement configured to provide communications, exchange data, or both, between components of system 300. For example, communication network 308 may include any type of network (including infrastructure) that may provide communications, exchange information, and/or facilitate the exchange of information, such as the Internet, a private data network, a virtual private network using a public network, a LAN or WAN network, a Wi-Fi™ network, and/or other suitable connections that may enable information exchange among various components of system 300. Communication network 308 may also include a public switched telephone network ("PSTN") and/or a wireless cellular network. Communication network 308 may be a secured network or unsecured network. In some embodiments, one or more components of system 300 may communicate directly through a dedicated communication link(s).

Customer devices 302(1)-302(n) may be one or more computing devices configured to perform one or more operations consistent with the disclosed embodiments, as described more fully below, for example, in relation to FIG. 5. Customer devices 302(1)-302(n) may execute browser or related mobile display software that displays an e-commerce website for placing orders for delivery of products, receiving orders and delivering products that are ordered, on a display included in, or connected to, customer devices 302(1)-302(n). Customer devices 302(1)-302(n) may also store and execute other mobile applications that may allow customers to interact with an e-commerce website provided by the e-commerce service provider device 304.

It is to be understood that the configuration of the functional blocks of system 300 has been defined herein for convenience of description. The components and arrangement of the components included in system 300 may vary. For example, in some embodiments, system 300 may include other components that perform or assist in the performance of one or more processes consistent with disclosed methods. System 300 may include a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 4:
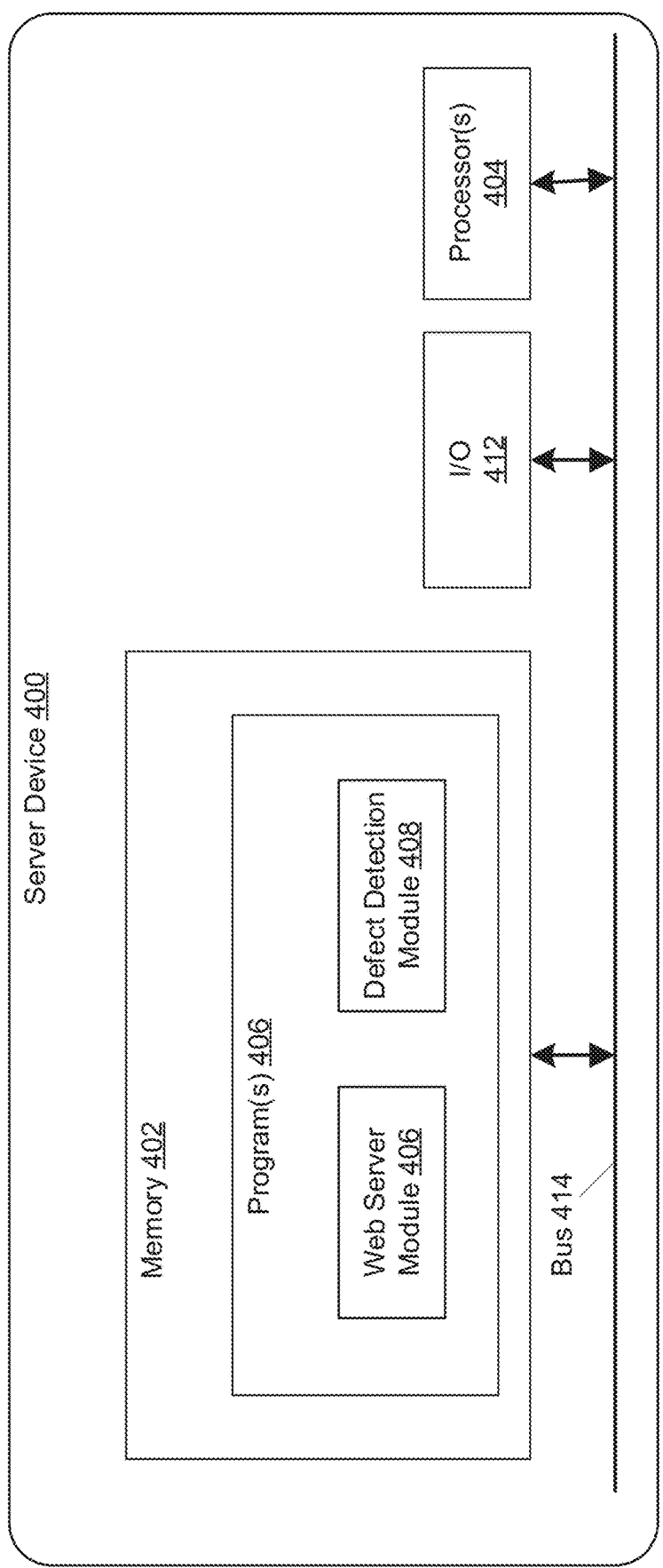
FIG. 4 is a block diagram of an exemplary server system for processing exception event requests to identify defective products, consistent with disclosed embodiments.

FIG. 4 shows an exemplary server device 400 consistent with the disclosed embodiments. Variations of exemplary server device 400 may constitute one or more components of e-commerce service provider device 304. In one exemplary embodiment, server device 400 may include one or more memories 402, one or more I/O devices 406, and one or more processors 408 communicating via a bus 414. In some exemplary embodiments, server device 400 may be a part of e-commerce service provider device 304. In some exemplary embodiments, server device 400 may take the form of a specially programmed server or computing system used by e-commerce service provider device 304 to perform complete functions of e-commerce service provider device 304. In some exemplary embodiments, server device 400 may be configured as an apparatus, embedded system, dedicated circuit, or the like based on the storage, execution, and/or implementation of software instructions that perform one or more operations consistent with the disclosed embodiments.

Memory 402 may include one or more storage devices configured to store instructions used by processor 404 to perform functions related to disclosed embodiments. For example, memory 402 may be configured with one or more software instructions, such as program(s) 406 that may perform one or more operations when executed by processor 404. The disclosed embodiments are not limited to separate programs or computers configured to perform dedicated tasks. For example, memory 402 may include a single program 406 that performs the functions of server device 400, or program 406 may comprise multiple programs. In certain embodiments, memory 402 may store sets of instructions or programs 406 for performing functions of e-commerce service provider device 304. These sets of instructions may be executed by processor 404 to perform communication and/or processes consistent with disclosed embodiments.

In certain embodiments, when server device 400 constitutes one or more of the components of e-commerce service provider device 304, memory 402 may include programs 406. Programs 406 may include a web server module 406, and defect detection module 408 as described in detail below.

In other embodiments, each of the web server module 406 and defect detection module 408 may be implemented as separate and individual servers communicating with each other, and with customer devices 302(1)-302(n), e-commerce service provider device 304, database 306, and/or inventory warehouse 310 over communication network 108.

Web server module 406 may allow customer devices 302(1)-302(n) to access e-commerce website and further provide communications between database 306, database 306 and inventory warehouse 310 to purchase products on e-commerce website as well as to perform any other communications with e-commerce website.

Figure 6A:
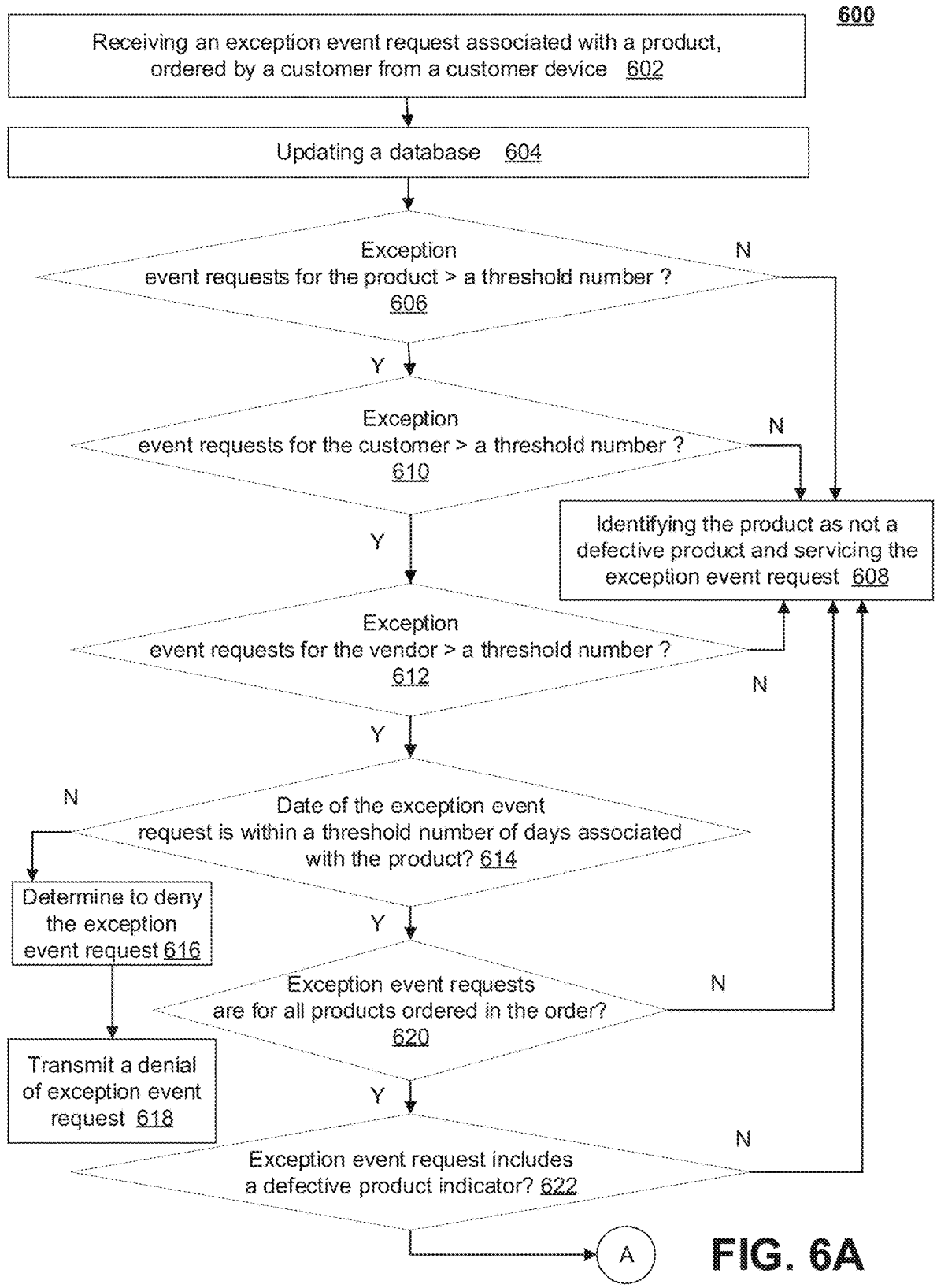
FIGS. 6A-6C contains a detailed flowchart of an exemplary process of processing exception event requests to identify defective products, consistent with disclosed embodiments.
Figure 6B:
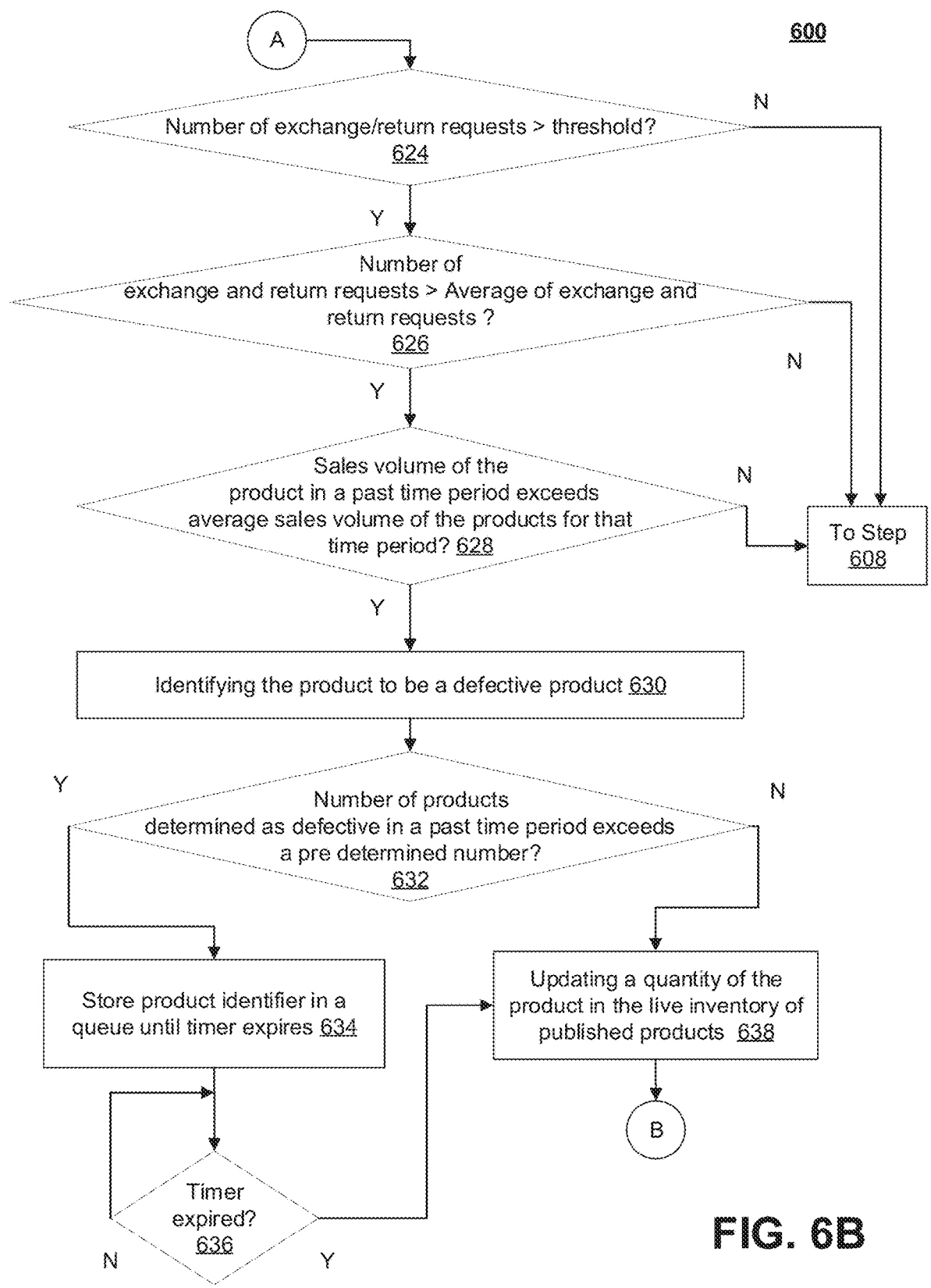
Figure 6C:
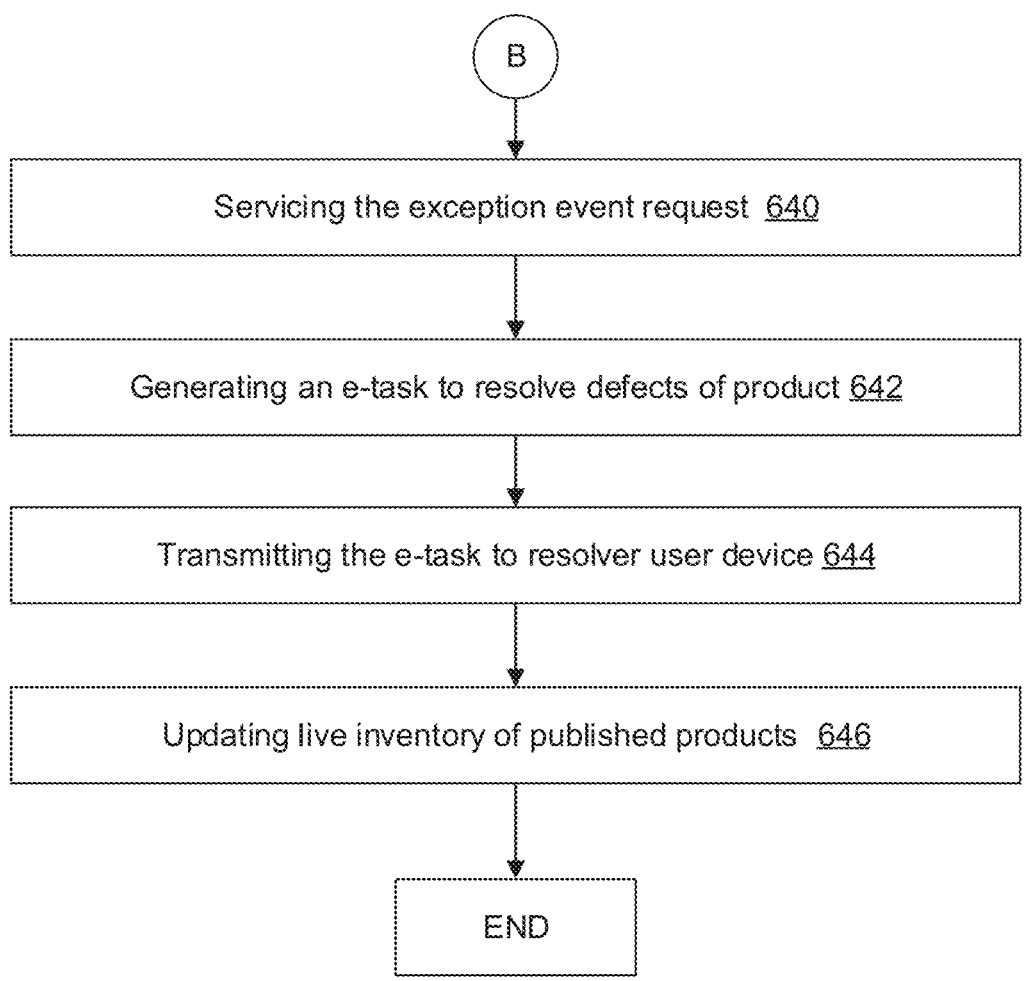

Defect detection module 408 of e-commerce module may be pre-programmed to perform steps of FIGS. 6A-6C to detect defect in products available on e-commerce website. FIGS. 6A-6C are explained in detail below.

Input/output (I/O) 412 may include various input/output devices, such as a keyboard, a mouse-type device, a gesture sensor, an action sensor, a physical button, switch, microphone, touchscreen panel, stylus, etc., that may be manipulated by customer devices 302(1)-302(n). I/O devices 412 may also include an audio output device. Exemplary communication modules of I/O devices 412 may include, for example, a short-range or near field wireless communication modem, a Wi-Fi™ communication modem, or a cellular communication modem. I/O devices 412 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server device 400 to exchange information with e-commerce service provider device 304, customer devices 302(1)-302(n), inventory warehouse 310 or database 306 via communication network 308.

Processor 404 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 300.

Bus 414 may be configured to provide communication between memory 402, processor 404 and I/O 412.

In an exemplary embodiment, server device 400 may be implemented as any of the components of block diagram 100 to perform operations of FIGS. 1A-1E. In another exemplary embodiment, server device 400 may be implemented as part of block diagram 100 to perform operations of FIGS. 1A-1E.

Figure 5:
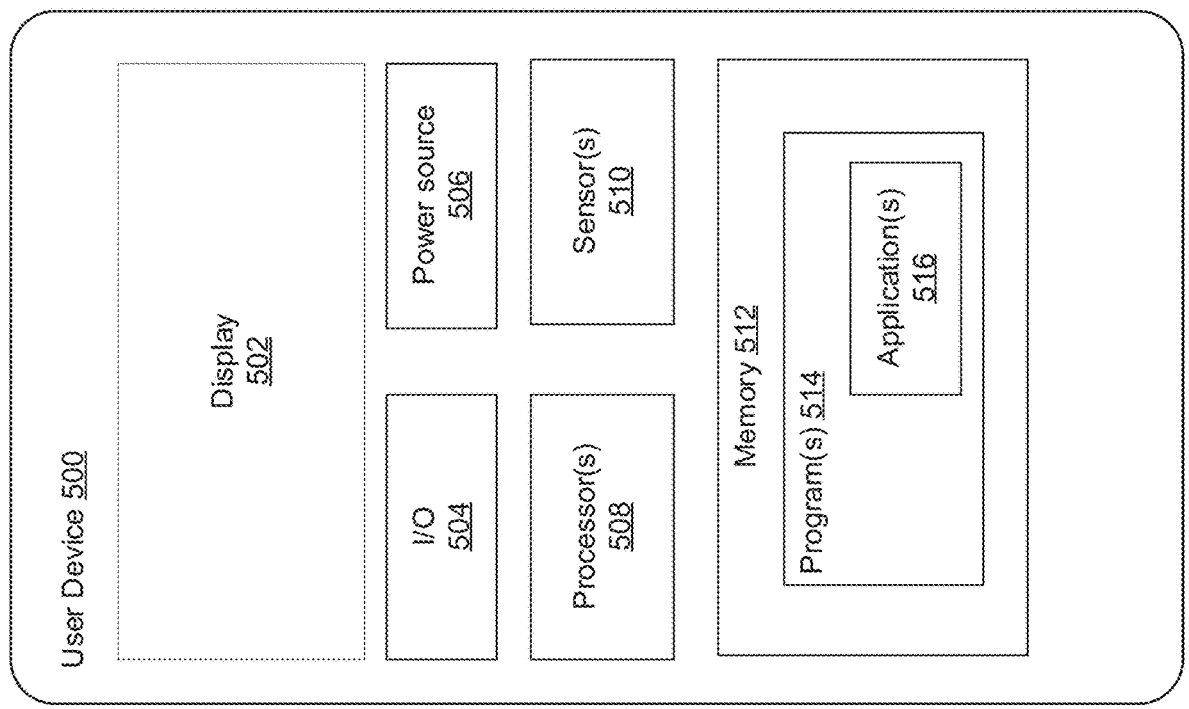
FIG. 5 is a block diagram of an exemplary user device, consistent with disclosed embodiments.

FIG. 5 shows an exemplary configuration of user device 500, consistent with disclosed embodiments. User device 500 of FIG. 5 represents an exemplary configuration of each of the customer devices 302(1)-302(n).

User device 500 may enable customers associated with customer devices 302(1)-302(n) to, for example, perform remote interactions or mobile transactions with e-commerce service provider device 304, or receive information from e-commerce service provider device 304. In some exemplary embodiments, user device 500 may be a personal computing device. For example, user device 500 may be a smartphone, a laptop or notebook computer, a tablet, a multifunctional watch, a pair of multifunctional glasses, or any mobile or wearable device with computing ability, or any combination of these computers and/or affiliated components. User device 500, in some exemplary embodiments, may include a plurality of devices 502-516, including display device 502, I/O device 504, power source 506, one or more processors 508, one or more sensors 510, and a memory 512. The memory 512 may include one or more programs 514, and the one or more programs 514 may include one or more applications 516. In some embodiments, each of the devices depicted in FIG. 5 may be present in singular form, while in other embodiments one or more of the devices may be consolidated, combined, or duplicated.

User device 500 may include display device 502. Display device 502 may include, for example, a liquid crystal display (LCD), a light emitting diode screen (LED), an organic light emitting diode screen (OLED), a touch screen, or other known display devices. Display device 502 may display various information to customers, drivers and merchants. For example, display device 502 may display an interactive interface enabling customers, drivers and merchants to operate user device 500 to perform certain aspects of the disclosed methods. Display device 502 may display touchable or selectable options for customers, drivers and merchants to select and may receive customer selection of options through a touch screen.

User device 500 may include I/O devices 504 that allows to send and receive information or interact with customers or another device. For example, I/O devices 504 may include various input/output devices, such as a keyboard, a mouse-type device, a gesture sensor, an action sensor, a physical button, switch, microphone, touchscreen panel, stylus, etc., that may be manipulated by customers to input information using user device 500. I/O devices 504 may also include an audio output device, such as a speaker configured to provide sound and audio feedback to customers operating user device 300. In some embodiments, I/O devices 504 may include a light emitting component, such as a LED or other component capable of providing a visible signal to customers, drivers and merchants. I/O devices 504 may also include haptic output devices, to provide haptic feedback to customers. I/O devices 504 may also include one or more communication modules (not shown) for sending and receiving information from other components in system 300 by, for example, establishing wired or wireless connectivity between user device 500 and communication network 308. I/O devices 504 may include radio frequency, infrared, or other near-field communication interfaces, for communicating with other devices associated with communication network 308. Exemplary communication modules of I/O devices 504 may include, for example, a short-range or near field wireless communication modem, a Wi-Fi™ communication modem, or a cellular communication modem. I/O devices 504 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 500 to exchange information with e-commerce service provider device 304 or database 306 via communication network 308.

Power source 506 of user device 500 may be utilized to power user device 500 and the components therein. Power source 506 may be coupled to a battery (not shown in the drawings) that may supply power to turn on and off user device 500.

User device 500 may include one or more processors 508 configured to execute software instructions stored in memory, such as a memory 512. Processor(s) 308 may be, for example, a desktop CPU or a mobile CPU of known types.

User device 500 may include one or more sensors 510. Sensors 510 may include one or more gyroscope sensors, one or more cameras, one or more accelerometer sensors, although any other type of sensors may also be included in user device 300.

User device 500 may include memory 512 that may store one or more software programs 514 that when executed by processor 508 perform known Internet-related communication, content display processes, and other interactive processes for customers, drivers and/or merchants. For instance, user device 500 may execute a browser or related mobile display software that generates and displays interfaces including content on a display device 502 included in, or in communication with, user device 500. User device 500 may be a mobile device that executes mobile device applications and/or mobile device communication software, included in programs 514, that allows user device 500 to communicate with e-commerce service provider device 304 and other components via communication network 308, to generate and display content in interfaces via display device 502. The disclosed embodiments are not limited to any particular configuration of user device 500. User device 500 may include any arrangement of one or more computing devices configured to perform one or more operations consistent with disclosed embodiments.

User device 500 may be configured to store, in memory 512, one or more operating systems that perform known operating system functions when executed by processor 508. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 500 may also include communication software stored in memory 512 that, when executed by processor 508, may provide communications with communication network 308, such as Web browser software, tablet or smart handheld device networking software, etc.

As described above, user device 500 may be a device that executes mobile applications for performing operations consistent with disclosed embodiments. Thus, in some embodiments, programs 514 stored on user device 500 may include one or more software applications 516 installed thereon, that may enable user device 500 to communicate with e-commerce service provider device 304 via communication network 308 and perform aspects of the disclosed embodiments. For example, user device 500 may connect to e-commerce service provider device 304 by using browser software to access and receive information or perform other operations associated with an internet service provider.

According to an exemplary embodiment, software applications 516 associated with e-commerce service provider device 304 may be installed on user device 500, as shown in FIG. 5. For example, in an embodiment where customer devices 302(1)-302(n) may be implemented as user device 500. In this embodiment, e-commerce service provider device 304 may receive a request from user device 500 to download one or more software applications 516 to user device 500. In one embodiment, e-commerce service provider device 304 may receive the request from a customer associated with user device 500, using a web browser application native to user device 500 respectively. In another exemplary embodiment, e-commerce service provider device 304 may receive the request to download one or more software applications 516 associated with e-commerce service provider device 304 onto user device 500 from a webpage or another portal associated with e-commerce service provider device 304 accessed via user device 500. In this embodiment, e-commerce service provider device 304 may store software instructions corresponding to one or more software applications 516 in database 306. For responding to the download request, e-commerce service provider device 304 may receive additional information from user device 500 regarding the particular device specifications of user device 500 to enable user device 500 to download software instructions corresponding to the particular specifications. Alternatively, e-commerce service provider device 304 may push a download request link to user device 500 or transmit software code corresponding to one or more software applications 516 directly to user device 500 in, for example, an e-mail, a text or short message service (SMS) message, a prompt through an app, or other suitable method. User device 500 may receive the software code related to one or more software applications 516, such as via communication network 308, to download and install the software code.

FIGS. 6A, 6B & 6C each contains a flowchart of an exemplary process 600 implemented by e-commerce service provider device 304 for processing exception event request to identify defective product, consistent with the disclosed embodiments. E-commerce service provider device 304 may be implemented as a server device 400 of FIG. 4 to execute software instructions that perform one or more of the operations of process 600. In one embodiment, defect detection module 408 of e-commerce service provider device 304 may perform steps 602-646.

In accordance with process 600, in step 602, e-commerce service provider device 304 may receive an exception event request associated with a product, ordered by a customer from one of customer devices 302(1)-302(n). In this example, exception request may be received from a customer associated with customer device 302(1).

By way of example, when a customer associated with customer device 302(1) purchases a product via e-commerce website, e-commerce service provider device 304 creates a new entry of order task in database 306. Order task is an entry stored in an order register on the database 306. Order register may include a list of order task entries corresponding to a new order, further each order task entry may include an order status identifier. Order status identifier may include corresponding status information such as order initiated, order confirmed, order processing, order shipped, order delivered, order task closed, and/or order task reopened, although any other status information may also be included. Order task entry stored in order register may also include an order number, a product identifier of the products purchased, date when the exception request was received from customer devices 302(1)-302(n), shipping information of the order, and customer identifier of the customer placing the order, although any other information associated with orders via e-commerce website.

By way of example, when a customer associated with customer device 302(1) places an order to purchase products, e-commerce service provider device 304 may update an order status identifier associated with the order task in the database 306 to "order initiated" and after the product is delivered to the customer, the e-commerce service provider device 304 may update the order status identifier associated with the order task in the database 306 to "order task closed".

When a customer identifies that a product includes defects upon receiving the product (upon delivery of order), the customer may place a request via the e-commerce website to request a return of the product or may request an exchange of the product. Defects in the received product may include, for example, functioning defects in electronic devices, rotten or expired fresh food products, broken products, dented products, although any other type of defects associated with products ordered via e-commerce website may also be included. In one exemplary embodiment, an e-commerce website may present the customer with various predefined return or exchange reasons as drop-down options when the customer places a request to return or exchange the product. Return or exchange reasons presented by drop down options may include, for example, product defective or doesn't work, product damaged, missing parts, broken parts, product arrived too late, inaccurate website description, order purchased by mistake, although any other type of return or exchange reasons may be presented as drop-down options. Further, the customer may be presented with options such as exchange the product with another product, return the product to get a refund on the e-commerce website, or any other types and/or combinations of options. Customers may be required to select one of these options, and upon receiving selection of the option, by the customer devices 302(1)-302(n) from the e-commerce website, e-commerce service provider device 304 may receive the exception event request. Exception event request received in step 602 may include the return or exchange reasons selected by the customers. Return or exchange reasons included in exception event request may be stored in database 306 by the e-commerce service provider 304 upon receiving the exception event request.

Exception event request may be either for an exchange of a product or a return of a product based on options selected by the customer on e-commerce website. When the exception event request is for an exchange of a product, then e-commerce service provider 304 may service the request to exchange the product. However, when the exception event request is for a return of a product, then e-commerce service provider 304 may service the request to return the product. Servicing the request to exchange or return the product by e-commerce service provider 304 is explained in detail below with reference to steps 608 and 640.

When customers place requests via e-commerce website to request a return of the product or a request to exchange the products which the customers have identified to be defective, such requests are referred to as exception event requests. When the e-commerce website receives a selection either requesting an exchange of the product with another product or a return of the product with a refund together with a corresponding return or exchange reasons, the e-commerce service provider device 304 may determine that the customer is requesting for exchange or return. This may require further processing of the order and reopening of the order task at the database 306 associated with the order under the exception of exchanging or returning the product purchase in that order. Accordingly, the e-commerce service provider device 304 may update the order register associated with that order in database 306 to the status of "order task reopened" and the e-commerce service provider device 304 may continue to process the exchange or return of the product as an exception. For any other order for which the product has been delivered the order task would be "order task closed" and no further action would be performed by the e-commerce service provider device 304.

In this example, customer associated with customer device 302(1) has requested a return of an electronic product (e.g., a phone), this electronic product may be referred to as Phone 1 and upon receiving the product the customer may identify Phone 1 to be defective, because Phone 1 is malfunctioning (e.g., Phone 1 does not power on).

By way of another example, a customer associated with customer device 302(1) may request an exchange of an electronic product (e.g. a lamp), which may be referred to as Lamp 1. Upon receiving the product the customer may identify Lamp 1 to be defective because the Lamp 1 is malfunctioning (e.g., Lamp 1 does not power on).

In step 604, e-commerce service provider device 304 may update an event register in database 304 to update a count of exception requests received for a product identifier associated with a product to be exchanged or returned. Event register may include an entry table that includes a list of product identifiers associated with their corresponding count of number of exception event requests received from customer devices 302(1)-302(n). Specifically, in this example, e-commerce service provider device 304 may update a count of number of exception event requests received for a product identifier of the product that the customer associated with customer device 302 would like to exchange or return. Product identifier may include a stock-keeping unit (SKU) number associated with product, although any other type of identifier to identify the product may also be included. In this example, a count of number of exception event requests associated with product identifier for Phone 1 may equal "50", which means that Phone 1 has previously been either exchanged or returned 50 times since the product has been made available to purchase on e-commerce website. Thus, in step 604, upon receiving the exception event request from customer device 302(1), e-commerce service provider device 304 may access database 306 and may update event register associated with a product identifier for Phone 1 from count of "50" to "51". Thus, after updating, the count of number of exception event requests associated with product identifier for Phone 1 may be equal to "51".

In another example, a customer identifier for customer associated with customer device 302(1) may be a customer account number. In this example, customer account number may be "123456". In step 604, e-commerce service provider device 304 may determine that a count of a number of exception event requests received from customer account number "123456" for Phone 1 is "5." This may indicate that Phone 1 has been either exchanged or returned "5" times by the customer associated with customer account number "123456". Thus, in step 604, upon receiving the exception event request from customer device 302(1), e-commerce service provider device 304 may access database 306 and may update the event register for a count of number of exception event requests received from customer account number "123456" regarding Phone 1 from count of "5" to "6". Thus, after updating, the count of a number of exception event requests received from customer account number "123456" associated with product identifier for Phone 1 may equal "6".

In another example, in step 604, e-commerce service provider device 304 may update event register to update a count of exception requests received for a vendor identifier associated with a vendor of a product to be exchanged or returned. A vendor may include companies, businesses, organizations, or an individual who is selling products on e-commerce website. Event register may include an entry table that includes a count of the number of exception event requests received for a vendor identifier. Specifically, in this example, e-commerce service provider device 304 may update the count of number of exception event requests received for the vendor identifier. Vendor identifier may include unique numbers assigned to a vendor by an e-commerce website or a name of the vendor. In this example, a vendor identifier may be "Company 1". In step 604, e-commerce service provider device 304 may determine that a count of number of exception event requests, associated with requests for exchange or return of Phone 1, for vendor identifier "Company 1" is "75". This may indicate that Phone 1 has been either exchanged or returned "75" times since its been available to purchase on e-commerce website. Thus, in step 604, upon receiving the exception event request from customer device 302(1), e-commerce service provider device 304 may access database 306 and may update the event register for a count of number of exception event requests received for vendor "Company 1" from count of "75" to "76". Thus, after updating, the count of number of exception event requests received for vendor identifier "Company 1" and associated with Phone 1 may equal "76".

In step 606, e-commerce service provider device 304 may access event register stored in database 304 to determine if the count of number of exception event requests associated with a product identifier exceeds a predefined threshold number of exception event requests previously stored in memory 402. The predefined threshold number of exception event requests may be stored in memory 402 by a system administrator.

In this example, a count of a number of predefined threshold number of exception event requests previously stored in memory 402 is "50". In step 606, upon accessing the event register stored in database 304, e-commerce service provider device 304 may determine that the count of number of exception event requests associated with Phone 1 is "51," which exceeds the count of number of predefined threshold number of exception event requests of "50". Upon determining, that the count of number of exception event requests associated with the product identifier for the product which the customer has requested exchange or return exceeds a predefined threshold number of exception event requests (step 606—yes), the method may proceed to step 610.

Back in step 606, when e-commerce service provider device 304 determines that the count of number of exception event requests associated with the product identifier for the product which the customer has requested exchange or return does not exceed predefined threshold number of exception event requests (step 606—no), the method may proceed to step 608. By way of example, a count of number of predefined threshold number of exception event requests previously stored in memory 402 may be "60." In step 606, e-commerce service provider device 304 may determine that the count of number of exception event requests associated with Phone 1 is "51," which does not exceed the count of number of predefined threshold number of exception event requests of "60." In this case, method 600 may proceed to step 608.

In step 610, e-commerce service provider device 304 may access event register stored in database 306 to determine if the count of number of exception event requests received from a particular customer identifier exceeds a predefined threshold number of exception event requests previously stored in memory 402. By way of example, the predefined threshold number of exception event requests may be stored by a system administrator.

In this example, a count of a number of predefined threshold number of exception event requests previously stored in memory 402 may be "5". In step 610, upon accessing the event register stored in database 306, e-commerce service provider device 304 may determine that the count of number of exception event requests received from customer account number "123456," to request exchange or return of a product identifier for Phone 1, is "6." This may indicate that Phone 1 has been either exchanged or returned "6" times by the customer associated with customer account number "123456." Thus, the count of exception event requests of 6 may exceed the count of number of predefined threshold number of exception event requests of "5". Upon determining, that the count of number of exception event requests received from a customer identifier exceeds a predefined threshold number of exception event requests (step 610—yes), method 600 may proceed to step 612.

Back in step 610, when e-commerce service provider device 304 determines that the count of number of exception event requests received from a customer identifier does not exceed a predefined threshold number of exception event requests previously stored in memory 402 (step 610—no), method 600 may proceed to step 608. By way of example, a predefined threshold number of exception event requests is a previously defined threshold number of exception event request for exchanging or returning of the product identifier associated with the product by customer devices 302(1)-302(n). For example, a count of number of predefined threshold number of exception event requests previously stored in memory 402 may be "10." In step 610, upon accessing the event register stored in database 306, e-commerce service provider device 304 may determine that the count of number of exception event requests for exchanging or returning of Phone 1 by a customer account number "123456" is "6," which does not exceed the threshold number of exception event requests of "10." In this case, method 600 may proceed to step 608.

In step 612, e-commerce service provider device 304 may access event register stored in database 306 to determine whether the count of number of exception event requests received for a vendor identifier of a vendor exceeds a predefined threshold number of exception event requests previously stored in memory 402. By way of example, the predefined threshold number of exception event requests previously stored in memory 402 may be stored by a system administrator. In this example, a count of number of predefined threshold number of exception event requests previously stored in memory 402 may be "75". In step 612, upon accessing the event register stored in database 306, e-commerce service provider device 304 may determine that the count of number of exception event requests received for a vendor identifier "Company 1" and associated with exchange or return of Phone 1 is "76." This may indicate that Phone 1 associated with vendor identifier "Company 1" has been either exchanged or returned "76" times, which exceeds the count of number of predefined threshold number of exception event requests of "75". Upon determining, that the count of number of exception event requests received of "76" for a vendor identifier "Company 1" exceeds a predefined threshold number of exception event requests (step 612—yes), method 600 may proceed to step 614.

Back in step 612, when e-commerce service provider device 304 determines that the count of number of exception event requests received for a vendor identifier does not exceed an associated predefined threshold number of exception event requests (step 612—no), method 600 may proceed to step 608. For example, a count of number of predefined threshold number of exception event requests previously stored in memory 402 may be "100". Upon accessing the event register stored in database 306, e-commerce service provider device 304 may determine that the count of number of exception event requests received for a vendor identifier "Company 1" associated with product identifier for Phone 1 equals "76". Thus, e-commerce service provider device 304 may determine that Phone 1 associated with vendor identifier "Company 1" has been either exchanged or returned "76" times and thus does not exceed the count of number of predefined threshold number of exception event requests of "100." In this case, method 600 may proceed to step 608.

In step 614, e-commerce service provider device 304 may determine whether the date when the exception request is received is within a threshold number of exchange or return days associated with a product identifier previously stored in memory 402. Back in step 602 when e-commerce service provider device 304 receives the exception request, e-commerce service provider device 304 may generate an order task entry and store it in order register. Order register may include an order number, a product identifier of the products purchased, shipping information of the order, and customer identifier of the customer placing the order, although any other information associated with orders via e-commerce website. In step 614, e-commerce service provider device 304 may access order register on the database 306 to query order task entry to determine the date when the exception request was received from customer devices 302(1)-302(n). Order register stored on the database 306 may include a list of order task entries corresponding to a new order, further each order task entry may include an order status identifier, an order number, a product identifier of the products purchased, date when the exception request was received from customer devices 302(1)-302(n), shipping information of the order, and customer identifier of the customer placing the order, although any other information associated with orders via e-commerce website. E-commerce service provider device 304 determines a date when the exception request was received by accessing an entry on the order register corresponding to the date when the exception request was received. E-commerce service provider device 304 utilizes this determined date of when the exception request was received for comparison with threshold number of exchange or return days associated with product requested for exchange or return in the received exception event request, as explained below.

E-commerce service provider device 304 may access a validity lookup table stored in database 306 to determine the threshold number of exchange or return days associated with product identifier of the product requested for exchange or return in the received exception event request. Validity lookup table may be a table that includes previously defined day ranges for each product identifier associated with a product. An exception event request for an exchange or return of products may be valid and permitted when the exception event request is received within these day ranges corresponding to each product. In step 614, e-commerce service provider device 304 may compare the date the exception request is received with the threshold number of days associated with the product to be exchanged or returned in the excepted request to determine whether the date the exception request is received is within the threshold number of day range associated with the product identifier determined based on accessing the validity lookup table. When e-commerce service provider device 304 determines that the exception request is within the threshold number of day range associated with the product identifier (step 614—yes), method 600 may proceed to step 620. When however, e-commerce service provider device 304 determines that the exception request is not within the threshold number of day range associated with the product identifier (step 614—no), method 600 may proceed to step 616.

In step 616, e-commerce provider device 304 may determine to deny the exception event request. Based on determining that the exception request is not within the threshold number of day range associated with the product identifier in step 614, e-commerce provider device 304 may determine that the exception event request cannot be serviced and thus determines a denial of exception event request and proceeds to step 618.

In step 618, e-commerce provider device 304 may transmit a denial of exception event request notification to customer devices 302(1)-302(n) from whom the exception event request was received. Denial of exception event request notification may include a short message service (SMS), an email, a call, and/or notification on an application stored on customer device 302(1). Denial of exception event request notification may indicate to the customer associated with customer devices 302(1)-302(n) that their exception event request to exchange or return a product has been denied and that the product cannot be exchanged or returned. By way of example, the denial of exception event request notification may be a message that reads "We are sorry to inform you, that your request to exchange "Phone 1" has been denied" or "We are sorry to inform you, that your request to return "Phone 1" has been denied."

In step 620, e-commerce service provider device 304 determines whether exchange or return request is received for all of the products that are included in the order for which exception event request is received in step 602. E-commerce service provider device 304 may access order register on the database 306 to query order task entry to determine product identifiers of products included in the order number for which exception event request is received. E-commerce service provider device 304 may then compare the determined product identifiers for products included in the order for which exception event request is received to the product identifiers associated with products that are received in the exception event request. By way of example, e-commerce service provider device 304 may determine that the order for which exception event is requested includes three products based on their product identifier, for example, "Phone 1", "Chair 1", and "Lamp 1." Further, e-commerce service provider device 304 may determine that the product identifiers for products included in the order and stored in the query order task entry of order register on the database 306 also includes three products, example, "Phone 1", "Chair 1", and "Lamp 1." Thus, e-commerce service provider device 304 may determine that exchange or return request is received for all of the products that are included in the order for which exception event request is received. Method 600 may then proceed to step 622.

However, back in step 620, e-commerce service provider device 304 may determine that the order for which exception event is requested includes three products based on their product identifier, for example, "Phone 1" and "Lamp 1", and the product identifiers for products included in the order and stored in the query order task entry of order register on the database 306 also includes three products, example, "Phone 1", "Chair 1", and "Lamp 1." In this case, e-commerce service provider device 304 may determine that exchange or return request is not received for all of the products that are included in the order for which exception event request is received. Method 600 may then proceed to step 608.

In step 622, e-commerce service provider device 304 may determine whether the exception event request includes a defective product indicator based on a return or exchange reasons selected from a drop-down option while placing the request to return or exchange the product on the e-commerce website. Return or exchange reasons presented by drop down options may include product defective or doesn't work, product damaged, missing parts, broken parts, product arrived too late, inaccurate website description, order purchased by mistake, and/or any other type of return or exchange reasons. By way of example, based on predefined instructions stored in memory 402, e-commerce service provider device 304 may be programmed to determine the return or exchange reasons of product defective or doesn't work, product damaged, missing parts, and/or broken parts as defective product indicators, although any other type of product defect reasons may be included as defective product indicator. In step 622 e-commerce service provider 304 may query database 306 to access the stored return or exchange reasons received in the exception event request. E-commerce service provider 304 may determine whether the stored return or exchange reasons received in the exception event request includes at least one of the defective product indicators. When e-commerce service provider 304 determines that the stored return or exchange reasons received in the exception event request includes at least one of the defective product indicators (step 622—yes), method 600 may proceed to step 624. When e-commerce service provider 304 determines, however, that the stored return or exchange reasons received in the exception event request does not include at least one of the defective product indicators (step 622—no), method 600 may proceed to step 608.

In another example, e-commerce service provider device 304 may parse the exception event request to identify keywords within the exception event request. By way of example, exception event request may include a comment provided by a customer associated with the customer devices 302(1)-302(n) while placing the exception event request. In this example, a customer may provide a comment such as, "Received food has foul odor", "Received food has decay", "Expired food product was delivered", "Received product includes pesticide residue", and/or "Received product is broken", although any other type of comment may be provided by the customer. Upon receiving exception event request, e-commerce service provider device 304 may be configured to parse the customer comment and to identify a list of predefined keywords, such as, odor, mold, decay, expired, pesticide residue, crushed, and/or broken, although e-commerce service provider device 304 may also be programmed to identify any other words. Further, upon identifying any one of these keywords, method 600 may proceed to step 624. When, however, e-commerce service provider device 304 is not able to identify any one the keywords, then method 600 may proceed to step 608.

In step 624 (FIG. 6B), e-commerce service provider device 304 may determine whether during a past time period, a sum of the total number of exception event request to exchange product and the total number of exception event request to return product exceeds a previously defined threshold number stored in memory 402, which may be stored by a system administrator.

In some embodiments, a past time period may be 15 days, a total number of exception event requests to exchange product received in exception event request may be 25, a total number of exception event requests to return product received in exception event request may be 14, and a previously defined threshold number stored in memory 402 may be 35. In such a situation, e-commerce service provider device 304 may determine the sum of total number of exception event request to exchange product (e.g. 25) and total number of exception event request to return product (e.g. 14). Because this total of 39 exceeds the previously defined threshold number stored in memory 402 of 35, method 600 may proceed to step 626.

By way of another example, a past time period may be 15 days, a total number of exception event requests to exchange product received in an exception event request may be 25, a total number of exception event requests to return product received in exception event request may be 14, and a previously defined threshold number stored in memory 402 may be 25. In such a situation, e-commerce service provider device 304 may determine the sum of total number of exception event request to exchange product (e.g., 25) and total number of exception event request to return product (e.g. 14) as 39. Because the sum of total number of exception event request to exchange product and total number of exception event request to return product (e.g., 39) does not exceeds the previously defined threshold number stored in memory 402 of 25, method 600 may proceed to step 608.

In step 626, e-commerce service provider device 304 may determine whether a sum of total number of exception event requests to exchange products and a total number of exception event requests to return products exceed an average number of exchanges/returns over the same time period for all products within the same product category based on historical product data stored in memory 402.

Historical product data may include information for all the exception event requests received for exchanging products within a product category associated with the product received in exception event request as well as may include information for all the exception event requests received for returning products within a product category associated with the product received in exception event request. By way of example, e-commerce service provider device 304 may determine the product identifier may be "Phone 1" and the product category may be electronic category. Thus, e-commerce service provider device 304 may determine average of number of requests that may be received for exchanging products for a past time period and average of number of requests that may be received for returning products within the electronic category associated with Phone 1 received in exception event request for a past time period. Then e-commerce service provider device 304 may determine an average number of requests received for exchanging products and average of number of requests received for returning products within the electronic category associated with Phone 1 that may be received in exception event request for a past time period.

By way of example, a past time period, for example, may be 30 days, total number of exception event request to exchange Phone 1 may be 50, total number of exception event request to return Phone 1 may be 70, and average of number of requests received for exchanging products and average of number of requests received for returning products within the electronic category for a time period of 30 days may be 100. In such a situation, e-commerce service provider device 304 may determine whether in the past 30 days the sum of the total number of exception event request to exchange product, e.g., 50 and the total number of exception event request to return product e.g., 70 is 120, thus the sum of total number of exception event request to exchange product and total number of exception event request to return product may exceed the average number of all the exception event requests received for exchanging the product and returning the product for a time period of 30 days which may be 100. Thus, e-commerce service provider device 304 may determine that the during past time period a sum of total number of exception event requests to exchange product and total number of exception event requests to return product exceeds an average number of all the exception event requests received for exchanging the product and returning the product (step 626—yes) for a time period of 30 days. In this case, the method may proceed to step 628.

By way of example, a past time period, for example, may be 30 days, total number of exception event request to exchange Phone 1 may be 50, total number of exception event request to return Phone 1 may be 70, and an average of number of requests received for exchanging products and average of number of requests received for returning products within the electronic category for a time period of 30 days may be 150. In such a situation, e-commerce service provider device 304 may determine that in the past 30 days the sum of total number of exception event requests to exchange product e.g., 50 and total number of exception event requests to return product e.g., 70 is 120. Thus, in this case, the sum of total number of exception event requests to exchange product and total number of exception event requests to return product does not exceed the previous average number of all the exception event requests received for exchanging the product and returning the product for a time period of 30 days which is 150. In this example, e-commerce service provider device 304 may determine that during past time period a sum of total number of exception event requests to exchange product received in exception event request and total number of exception event requests to return product received in exception event request does not exceed the average number of all the exception event requests received for exchanging the product (step 626—no) and returning the product for a time period of 30 days. In this case, the method may proceed to step 608. (Step 608 is explained below).

In step 628, e-commerce service provider device 304 may determine whether during a past time period a sales volume associated with a product identifier of the product received in the exception event exceeds an average sales volume associated with all the products with a product category in which the product received in exception event request is included based on historical sales data stored in memory 402.

Historical sales data may include information for sales volume associated with product identifier of the product received in exception event request. By way of example, e-commerce service provider device 304 may access historical sales data and may determine an average sales volume associated with product category of the product. Further, e-commerce service provider device 304 may determine that the sales volume for product identifier is "Phone 1" is 550 sales during the past week and further the e-commerce service provider device 304 may determine that the Phone 1 product is included in a product category of electronic category. Then, e-commerce service provider device 304 may determine an average sales volume for products in the electronic category is 450 for a past time period of 1 week.

By way of example, a past time period may be one week, and the sales volume of the product Phone 1 may be 550 products for the past one week while the average sales volume for the products within electronic category may be 450. Thus, e-commerce service provider device 304 may determine that sales volume of 550 products in a past time period of 1 week exceeds the average sales volume for the products (step 628—yes) within the electronic category which is 450. In this case, the method may proceed to step 630.

By way of example, a past time period, for example, may be 1 week, and the sales volume of the product Phone 1 may be 550 products for a past 1 week while the average sales volume for the products within electronic category may be 600. Thus, e-commerce service provider device 304 may determine that sales volume of 550 products in a past time period of 1 week does not exceeds the average sales volume for the products (step—no) within the electronic category which is 600. In this case, the method may proceed to step 608. (Step 608 is explained below).

In step 630, e-commerce service provider device 304 may identify the product associated with the product identifier received in the exception event request as a defective product. Upon identifying the product as a defective product, the method may proceed to include an entry of a product identifier associated with the product in a defective product register stored in database 306. Defective product register may be a table that stores a list of products determined to be defective in step 630. By way of example, e-commerce service provider device 304 may determine "Phone 1" product is a defective product. Thus, e-commerce service provider device 304 may determine that product "Phone 1" associated with the product identifier received in the exception event request may be a defective product (step 630—yes). In this case, the method may proceed to step 632.

In step 632, e-commerce service provider device 304 may access a defective product register stored in database 306 and may determine a number of products identified as defective in step 630 within a past time period exceeds a pre-determined number previously stored in memory 402. By way of example, e-commerce service provider device 304 may determine that the number of products determined to be defective within a past time period of 24 hours is "30", whereas pre-determined number of products that may be defective and previously stored in memory 402 is "25". In this example, e-commerce service provider device 304 may determine that the number of products determined to be defective within a past time period of 24 hours may be "30" which exceeds the pre-determined number of products (e.g., 25) determined to be defective (step 632—yes) and previously stored in memory 402, and the method may proceed to step 634.

In step 634, e-commerce service provider device 304 may store product identifier of the product received in exception event request and determined to be a defective product in a defective product queue stored in database 306 until expiry of a timer associated with a time period. Defective product queue may be a queue which includes products that may be processed at a later time after expiry of the time period of step 632. By way of example, a time period may be 24 hours, although any other time period may also be included. The method may proceed to step 636.

In step 636, e-commerce service provider device 304 may determine whether a timer associated with determining a number of products as defective within a past time period of step 632 has expired. By way of example, a timer period associated with the timer may be 24 hours. When e-commerce service provider device 304 determines that the time has not expired, then the method may loop back to step 636 and may determine whether the time has expired. When e-commerce service provider device 304 may determine that the timer has expired (step 636—yes), the method may proceed to step 638.

Going back to step 632, if e-commerce service provider device 304 determines that the number of products determined to be defective within a past time does not exceed the pre-determined number of products determined to be defective (step 632—yes), the method may proceed to step 638.

In step 638, e-commerce service provider device 304 may update a quantity of the product associated with the product identifier that may be defective in step 632 in the live inventory of products published on e-commerce website. The live inventory of products is stored in database 306. Live inventory of products includes a list of all the available products along with the quantity of products available at inventory warehouse 310. Upon updating the quantity of the product, this update may be reflected on the e-commerce website such that updating of quantity of the product may include reducing the available quantity of the product that may be determined as defective to zero. Upon reducing the available quantity to zero, the e-commerce website may reflect the update such that customers of e-commerce website may not be able to purchase a product determined to defective. Thus, customers may be restricted from purchasing products determined to be defective, the method may then proceed to step 640 (FIG. 6C).

In step 640, e-commerce service provider device 304 may service the exception event request based on determining whether the exception event request is for exchanging a product or returning a product. Servicing of exception event request may comprise transmitting a return product notification to customer devices 302(1)-302(n) when the exception event request is a request to return a product. Further, when the exception event request is a request to exchange a product, servicing of exception event request refers to shipping the product requested by the customer to be exchanged as well as transmitting a return product notification to customer devices 302(1)-302(n) to return the product. Return product notification may be a short message service (SMS), an email, a call, or notification on an application stored on customer device 302(1). Return product notification may include a return label, such as, a barcode or a QR code to be utilized by customers to return the product by shipping the product to the inventory warehouse 310 then method may proceed to step 642.

In step 642, e-commerce service provider device 304 may generate an electronic task, also referred to as e-task, to resolve defects of products that may be determined to be defective products in step 632. E-task may be an electronic task completion ticket such as Jira tickets. An e-task may be an entry in a table of a database 306. The entry may include information such as status of the task, product identifier associated with products determined to be defective, number of exception event requests received for the products, any other information associated with a product may also be included. Status of the task may include "In process" or "Resolved", although any other type of status associated with electronic tickets may be included. E-tasks may be utilized by service personnel to perform a quality check of the products determined to be as defective product.

In step 644, e-commerce service provider device 304, may transmit the e-task to a resolver user device. Resolver user device (not shown in figures) may be a user device 500 accessed by service personnel at the inventory warehouse 310. E-task may be transmitted to the resolver user device as a short message service (SMS), an email, a call, or notification on an application on resolver user device, any other method to transmit the e-task may be utilized. In another embodiment, e-commerce service provider device 304, may transmit the e-task to resolver user device at multiple inventory warehouses 310 [not shown in figures]. In yet another embodiment, e-commerce service provider device 304, may transmit the e-task to a plurality of resolver user devices at inventory warehouse 310.

Service personnel associated with resolver user device may personally verify whether the service exception event request does satisfy the product is defective. Based on determining by service personnel whether the service exception request is defective, service personnel may access a user interface via an application on the resolver user device to select one of "Yes" or "No" options displayed on the user interface. Upon selecting the "Yes" option, an indication confirming that the product is defective is transmitted as a resolved task notification to the e-commerce service provider device 304. Further, upon selecting the "No" option, an indication confirming that the product is not defective is transmitted as a resolved task notification to the e-commerce service provider device 304. Along with the "Yes" or "No" option selection, service personnel may also select other options provided on user interface of the application on the resolver user device. Other options on the user interface may include "Defect will be fixed" (indicating whether the defect associated with the product would be resolved), "Defect will not fix" (indicating whether the defect associated with the product would not be resolved), "Defect has been resolved" (indicating whether the defect associated with the product has been resolved), or "Agent mistake" (indicating that the product is not defective and the product was incorrectly identified as a defective product), although other options may also be included.

In response to the selections, resolver user device may transmit a resolved task notification to the e-commerce service provider device 304. Resolved task notification may be a short message service (SMS), an email, a call, or notification on an application stored on customer device 302(1) and may include one or more option selections made by the service personnel on the user interface via the application on the resolver user device.

Further, in another embodiment, in step 644, before transmitting the e-task to a resolver user device, e-commerce service provider device 304 may identify if the product identified as defective in step 630 is stored at multiple inventory warehouses based on product identifier associated with the product. E-commerce service provider device 304 may access a database 304 that stores a lookup table which includes a product identifier with its corresponding inventory warehouse identifier. E-commerce service provider device 304 may utilize this lookup table to identify at which of the multiple inventory warehouse is the product stored. Product identifier may include a stock keeping unit [SKU], although any other type of product identifier may also be included. By way of example, a product identifier associated with the product may be SKU 1. Inventory warehouse identifier may include a location name of the where the inventory warehouse is located, and/or a number assigned to the inventory warehouse. E-commerce service provider device 304 may determine that the product is stored at multiple inventory warehouses by accessing the database 304, by accessing the lookup table to determine that the product identifier is associated with more than inventory warehouse identifier. Upon determining a product is stored at more than one inventory warehouse, by way of example, e-commerce service provider device 304 may determine if the product corresponding with the product identifier SKU 1 at one of the inventory warehouses is a defective product. E-commerce service provider device 304 may transmit e-task to determine if the product is defective to other resolver user devices associated with other service personnel at the multiple inventory warehouses to determine if the product stored at each of the inventory warehouses are defective. The e-task may be sent as a notification on an application or a SMS to the other resolver user devices and the request may include. In response, service personnel associated with the other resolver user devices may transmit resolved task notification confirming whether the product is defective or not defective, as explained above. Upon the e-commerce service provider device 304 receiving the resolved task notification that the product is defective, by way of example, by selection of "Yes" option from one of the other resolver user devices [as explained above], then an identifier associated with the inventory warehouse is identified as storing defective products corresponding to the product identifier SKU 1. Identifier associated with the inventory warehouse corresponding to the resolver user device is identified as storing defective products may be stored as a list of inventory warehouses storing defective product corresponding with the product SKU 1 in a database 304.

In step 646, e-commerce service provider device 304, may update live inventory of published products displayed on e-commerce website upon receiving resolved task notification from the resolver user device. E-commerce service provider device 304 may analyze the received resolved task notification to determine option selections received from resolver user device. By way of example, upon e-commerce service provider device 304 analyzes the resolved task notification to determine that the selected option is "Yes" and "Defect has been resolved", then e-commerce service provider device 304 determines that product is not defective and that the product is to be made available for sale. As a result, e-commerce service provider device 304 may update the live inventory of products published on e-commerce website to reflect the quantity of products available before e-commerce service provider device 304 had reduced the available quantity to zero in step 638. E-commerce website may reflect the update such that customers of e-commerce website may be able to purchase the product.

In another embodiment, when e-commerce service provider device 304 receives plurality of resolved task notification from resolver user devices at multiple inventory warehouses, then e-commerce service provider device 304 may access the list of inventory warehouses storing defective products corresponding with the product SKU 1 stored in a database 304 to identify identifiers associated with those inventory warehouses that store defective products. Upon identifying identifiers of inventory warehouses that store defective products, e-commerce service provider device 304 may reduce the number of inventory of products to zero for those inventory warehouses identified as storing defective products. By way of example, if the total number of inventory for a product is 1000, and if the identified inventory warehouse that stores defective product corresponding to the product identifier SKU 1 is 300, then the total number of inventory for a product in the live inventory is updated to reflect as 700 by removing the 300 products stored at the inventory warehouse identified as storing defective products. Upon updating the total number of product inventory in the live inventory, the e-commerce service provider device 304 publishes on e-commerce website to reflect the quantity of products available as 700. E-commerce website may reflect the update such that customers of e-commerce website may be able to purchase the product.

In another example, when e-commerce service provider device 304 analyzes the resolved task notification and may determine the option selections received from resolver user device to be "No" and "Agent mistake", although any other options may also be included. In this example, e-commerce service provider device 304 updates the live inventory to reflect the quantity of products that were available before e-commerce service provider device 304 had reduced the available quantity to zero in step 638. E-commerce website may reflect the update such that customers of e-commerce website may be able to purchase the product.

In another embodiment, when e-commerce service provider device 304 analyzes the resolved task notification, to determine the option selections received from resolver user device to be "Yes" and "Defect will be fixed", although any other options may also be included. In this example, e-commerce service provider device 304 makes no changes to the live inventory of products and continues to maintain the available quantity at zero, the e-commerce website may continue to reflect that available quantity to be zero and customers of e-commerce website may not be able to purchase a product determined to defective.

Back when the method reaches step 608 from either one of the steps 606, 610, 612, 620, 622, 624, 626, and 628, e-commerce service provider device 304 may identify the product as not being a defective product and services the exception event request based on determining whether the exception event request is for exchanging a product or returning a product. When the e-commerce service provider device 304 determines that the exception event request is a request for exchanging a product then e-commerce service provider device 304 may transmit the exception event request for servicing to inventory warehouse 310. When the e-commerce service provider device 304 determines that the exception event request is a request for returning a product then e-commerce service provider device 304 may transmit a return notification to customer devices 302(1)-302(n). The return notification may be a short message service (SMS), an email, a call, or a notification on an application stored on customer device 302(1). Return notification may include a return label, such as, a barcode or a QR code to be utilized by customers to return the product by shipping the product to the inventory warehouse 310.

The disclosed embodiments provide an improved method for processing exception event requests to identify defective product. By providing technical advantages of an optimized process of identifying products that are defective in an e-commerce website based on exception event requests received from customer devices 302(1)-302(n). As this technology provides a system that may access a database to identify a number of exception event requests associated with a product identifier received in exception event request, this technology provides a fast and reliable process of identifying products to be defective and further by restricting customers to purchase products determined to be defective, which results in reducing the number of refund or exchange request received in exception event requests. Further, as this technology reduces the number of refund or exchange request received in exception event requests, this technology provides an optimized process of reducing network overload by reducing unexpected volume of requests that may have been received for a defective product, and resulting in reducing network delays, and thus increasing efficient utilization of network resources to improve an e-commerce businesses goals and also improve customer experience.

In contrast, in the prior art, other strategies that have been implemented are inefficient as they do not take into consideration determining defective products, which may not be beneficial to customers and results in poor customer experience. Further the prior art causes loss of customer trust, while the disclosed embodiments provides processing exception event requests to identify defective products, that provides improved utilization e-commerce resources and improves customer experience.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for processing exception event request to identify a defective product, the system comprising:
    a memory storing instructions; and
    at least one processor configured to execute the instructions to:
        present, to a first customer device, one or more selectable options associated with an exception event;
        receive, from the first customer device in response to selection of the one or more selectable options, an exception event request associated with a product included in an order associated with the first customer device, the received exception event request comprising a product identifier;
        update a database by storing the received exception event request with the product identifier;
        access the database to identify a number of exception event requests associated with the product identifier stored in the database;
        determine when the number of exception event requests associated with the product identifier exceeds a predetermined threshold number of exception event requests for the product identifier;
        in response to determining that the number of exception event requests associated with the product identifier exceeds the predetermined threshold number of exception event requests, identify the product as a defective product;
        generate an electronic task upon identifying the product as the defective product, the electronic task comprising the product identifier;
        transmit the electronic task to a user device;
        update a quantity of the product in a live inventory database in response to transmitting the electronic task to the user device, wherein the live inventory database comprise the one or more products that are available for purchase to the plurality of customers;
        update, the database, by storing the received exception event requests with a vendor identifier;
        access the database to identify a number of exception event requests associated with the vendor identifier stored in the database;
        determine when the number of exception event requests associated with the vendor identifier exceeds a predetermined threshold number of exception event requests for the vendor identifier; and
        in response to determining that the number of exception event requests associated with the vendor identifier exceeds the predetermined threshold number of exception event requests, identify the product as the defective product.

2. The system of claim 1, wherein the instructions further cause the processor to:
    access the database to identify a sales volume associated with the product identifier for a time period and an average sales volume associated with a product category; and
    determine whether the sales volume associated with the product identifier for the time period exceeds the average sales volume associated with the product category for the time period.

3. The system of claim 2, wherein the instructions further cause the processor to:
    in response to determining that the sales volume associated with the product identifier for the time period exceeds the average sales volume associated with the product category for the time period, identify the product as a defective product.

4. The system of claim 1, wherein the instructions further cause the processor to:
    in response to determining that the number of exception event requests associated with the product identifier does not exceed the predetermined threshold number of exception event requests, transmitting a return product notification to the first customer device.

5. The system of claim 1, wherein the instructions further cause the processor to:
update the quantity of the product in the live inventory database in response to receiving a resolved task notification from the user device.

6. A computer implemented method for processing exception event request to identify a defective product, the method comprising:
presenting, to a first customer device, one or more selectable options associated with an exception event;
receiving, from the first customer device in response to selection of the one or more selectable options, an exception event request associated with a product included in an order associated with the first customer device, the received exception event request comprising a product identifier;
updating a database by storing the received exception event request with the product identifier;
accessing the database to identify a number of exception event requests associated with the product identifier stored in the database;
determining when the number of exception event requests associated with the product identifier exceeds a predetermined threshold number of exception event requests for the product identifier;
in response to determining that the number of exception event requests associated with the product identifier exceeds the predetermined threshold number of exception event requests, identify the product as a defective product;
generating an electronic task upon identifying the product as the defective product, the electronic task comprising the product identifier;
transmitting the electronic task to a user device;
updating a quantity of the product in a live inventory database in response to transmitting the electronic task to the user device, wherein the live inventory database comprise the one or more products that are available for purchase to the plurality of customers;
accessing the database to identify a sales volume associated with the product identifier for a time period and an average sales volume associated with a product category; and
determining whether the sales volume associated with the product identifier for the time period exceeds the average sales volume associated with the product category for the time period.

7. The method of claim 6, further comprising:
updating, the database, by storing the received exception event requests with a vendor identifier;
accessing the database to identify a number of exception event requests associated with the vendor identifier stored in the database; and
determining when the number of exception event requests associated with the vendor identifier exceeds a predetermined threshold number of exception event requests for the vendor identifier.

8. The method of claim 7, further comprising:
in response to determining that the number of exception event requests associated with the vendor identifier exceeds the predetermined threshold number of exception event requests, identify the product as the defective product.

9. The method of claim 6, further comprising:
in response to determining that the sales volume associated with the product identifier for the time period exceeds the average sales volume associated with the product category for the time period, identify the product as a defective product.

10. The method of claim 6, further comprising:
in response to determining that the number of exception event requests associated with the product identifier does not exceed the predetermined threshold number of exception event requests, transmitting a return product notification to the first customer device.

11. The method of claim 6, further comprising:
updating the quantity of the product in the live inventory database in response to receiving a resolved task notification from the user device.

12. A computer-implemented system for processing exception event request to identify a defective product, the system comprising:
a memory storing instructions; and
at least one processor configured to execute the instructions to:
present, to a first customer device, one or more selectable options associated with an exception event;
receive, from the first customer device in response to selection of the one or more selectable options, an exception event request associated with a product included in an order associated with the first customer device, the received exception event request comprising a product identifier;
update a database by storing the received exception event request with the product identifier;
determine if the exception event request is within a threshold number of day range associated with the product identifier;
access the database to identify a number of exception event requests associated with the product identifier stored in the database;
determine when the number of exception event requests associated with the product identifier exceeds a predetermined threshold number of exception event requests for the product identifier;
in response to determining that the number of exception event requests associated with the product identifier exceeds the predetermined threshold number of exception event requests, identify the product as a defective product;
in response to determining that the number of exception event requests associated with the product identifier does not exceed the predetermined threshold number of exception event requests, transmitting a return product notification to the first customer device;
generate an electronic task upon identifying the product as the defective product, the electronic task comprising the product identifier;
transmit the electronic task to a user device; and
update a quantity of the product in a live inventory database in response to transmitting the electronic task to the user device, wherein the live inventory database comprise the one or more products that are available for purchase to the plurality of customers.

13. The computer-implemented system of claim 12, wherein the instructions further cause the processor to:
update, the database, by storing the received exception event requests with a vendor identifier;

access the database to identify a number of exception event requests associated with the vendor identifier stored in the database; and determine when the number of exception event requests associated with the vendor identifier exceeds a predetermined threshold number of exception event requests for the vendor identifier.

14. The computer-implemented system of claim 13, wherein the instructions further cause the processor to:

in response to determining that the number of exception event requests associated with the vendor identifier exceeds the predetermined threshold number of exception event requests, identify the product as the defective product.

15. The computer-implemented system of claim 12, wherein the instructions further cause the processor to:

access the database to identify a sales volume associated with the product identifier for a time period and an average sales volume associated with a product category; and determine whether the sales volume associated with the product identifier for the time period exceeds the average sales volume associated with the product category for the time period.

16. The computer-implemented system of claim 15, wherein the instructions further cause the processor to:

in response to determining that the sales volume associated with the product identifier for the time period exceeds the average sales volume associated with the product category for the time period, identify the product as a defective product.

17. The computer-implemented system of claim 12, wherein the instructions further cause the processor to:

updating the quantity of the product in the live inventory database in response to receiving a resolved task notification from the user device.

18. The system of claim 1, wherein the one or more selectable options includes at least one reason for the exception event request, the at least one reason being associated with the product identifier and being selected as a drop down option on the first customer device.

19. The method of claim 6, further comprising:

selecting at least one reason for the exception event request from the one or more selectable options using a drop down option on the first customer device.

20. The system of claim 12, wherein the one or more selectable options includes at least one reason for the exception event request, the at least one reason being associated with the product identifier and being selected as a drop down option on the first customer device.

* * * * *